Sept. 5, 1967

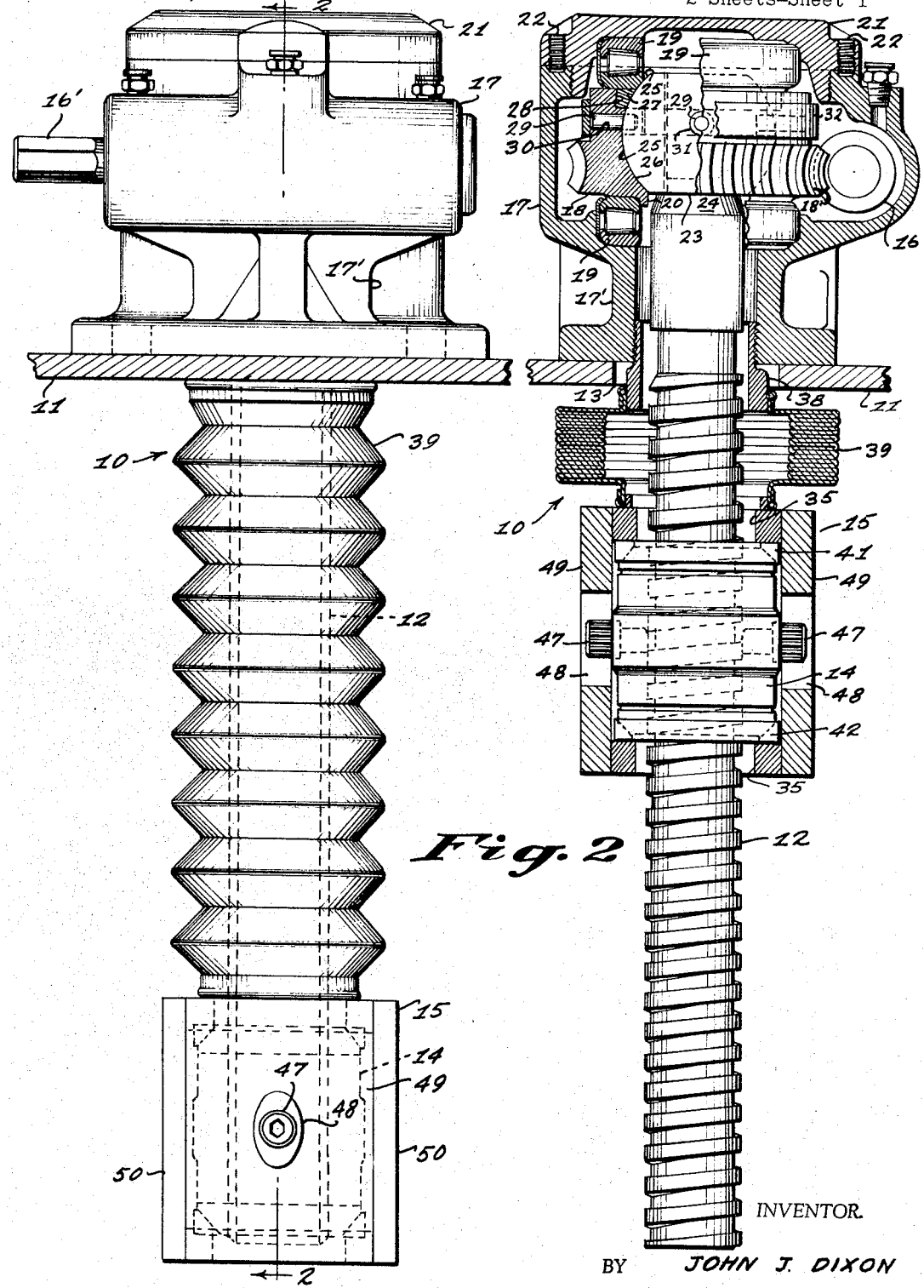

J. J. DIXON 3,339,892

JACK MECHANISM

Filed June 3, 1966

INVENTOR.
JOHN J. DIXON

United States Patent Office 3,339,892
Patented Sept. 5, 1967

3,339,892
JACK MECHANISM
John J. Dixon, Charlotte, N.C., assignor to Duff-Norton Company, Charlotte, N.C., a corporation of North Carolina
Filed June 3, 1966, Ser. No. 555,092
14 Claims. (Cl. 254—103)

The present invention is directed to a jack mechanism, and more particularly to a non-binding jack mechanism of the rotating screw type capable of efficient operation under conditions wherein the load causes angular displacement of the jack screw or is spherically displaced with respect thereto.

Conventional screw-type jacks are generally incapable of adjustment to displaced load conditions that tend to misalign the jack screw with respect to the drive mechanism of the jack, with the result that the jack screw is subjected to side loading that causes undue wear and reduces the efficiency of the mechanism, even to the extent of causing the mechanism to bind when the side loading is severe. A solution to this problem with respect to rotating nut type mechanisms is disclosed and claimed in Beck U.S. Patent No. 3,135,497, issued June 2, 1964, which is directed primarily to a composite operating nut construction having components that are angularly displaceable with respect to each other.

The present invention, on the other hand, is directed to a rotating screw-type jack mechanism wherein the operating or drive means is separated from the nut such that angular displacement of the nut would not alone permit angular displacement of the jack screw. This separation of the drive means and nut of a rotating screw type jack mechanism is preferable in certain installations as the drive means can be conveniently located on a fixed support apart from the travelling nut and the end of the screw can be disposed at the drive means without extension therebeyond during operation. By the present invention angular displacement is provided between the drive means and the screw without requiring any modification of the nut such as provided in the mechanism of the aforementioned Beck U.S. Patent No. 3,135,497, although spherical displacement of the load carrying member is included in the preferred embodiment to permit further accommodation of load conditions.

Briefly described, the jack mechanism of the present invention comprises an annular drive member supported for rotation by supporting means and driven by means that rotate the drive member for rotation of a jack screw that has connecting means thereon, which connecting means is seated in the annular drive member for support of the jack screw thereby and is spherically displaceable to permit angular displacement of the jack screw. The connecting means is keyed to the annular drive member for driving rotation of the jack screw by keying means that accommodate the aforementioned spherical displacement. The jack screw has threaded thereon a non-rotating nut that moves axially therealong upon rotation of the screw. In the preferred embodiment, a load-carrying member is mounted on the nut with a pair of thrust rings disposed between the nut and load-carrying member, which thrust rings have mating frusto-spherical surfaces that permit spherical displacement of the load-carrying member with respect to the nut so that the load-carrying member can further accommodate spherically displaced load conditions.

The features and advantages of the present invention are included in the preferred embodiment that is described in detail hereinbelow and illustrated in the accompanying drawings, in which:

FIG. 1 is a side elevation of a preferred embodiment of the jack mechanism of the present invention, showing the nut and load-supporting member in their lowermost positions;

FIG. 2 is a vertical section taken along line 2—2 of FIG. 1 with the nut and load-supporting member in their uppermost position, and showing the nut and a portion of the worm gear drive member without sectioning.

Figure 3:
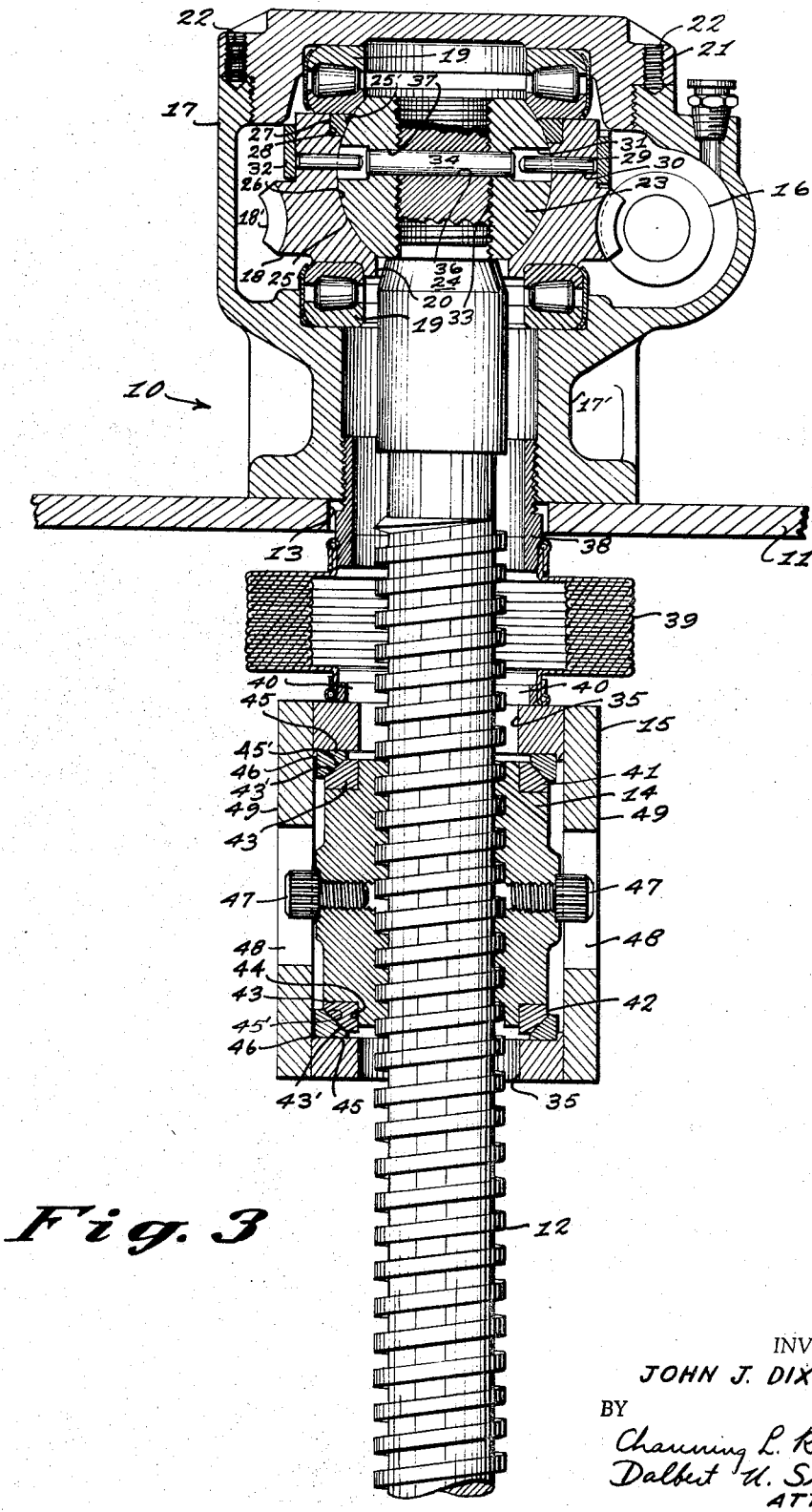
FIG. 3 is an enlarged vertical section similar to FIG. 2 and showing the nut and worm gear drive member in section.

In the illustrated embodiment, the jack mechanism 10 is seen mounted on a platform 11 or other suitable structure with a jack screw 12 depending from the mechanism 10 and extending through an aperture 13 in the platform 11 for support of a non-rotating, travelling nut 14 on which is mounted a load-carrying member 15.

This jack mechanism 10 is of the rotating screw type in which the screw 12 is rotated to raise or lower the non-rotating nut 14 by drive means acting through a drive member that is connected to the jack screw. In the illustrated embodiment, the drive means is in the form of a worm 16 mounted in the jack housing 17 and having an operating end 16′ extending from the housing 17 for connection to conventional power means (not shown). The worm 16 meshes with the teeth 18′ of a worm gear 18 that serves as an annular drive member for rotating the screw 12.

The worm gear 18 is supported in the housing 17 between a pair of spaced, annular load bearings 19, the lower one of which is seated in the base of the housing 17 and is overlapped by an inner retaining flange 20 on the worm gear 18, and the upper one of the load bearings 19 is held in worm gear retaining position by the housing cap 21, which is threaded into the housing and locked by set screws 22. The housing 17, load bearings 19 and housing cap 21 comprise the aforementioned means for supporting the worm gear 18 for rotation.

The jack screw 12 is connected to the worm gear 18 by connecting means, which, in the illustrated embodiment, includes a connecting member 23 secured to the upper end 24 of the jack screw 12 and having a frusto-spherical exterior surface 25 that is seated in and mates with a frusto-spherical interior surface 26 of the worm gear 18 whereby the connecting member 23 is spherically displaceable for universal pivotal support in the worm gear 18. The frusto-spherical interior surface 26 of the worm gear extends at least partially under the frusto-spherical exterior surface 25 of the connecting member 23 for load-bearing support of the jack screw 12 by the worm gear 18. The worm gear surface 26, however, is spaced from the upper end 24 of the jack screw 12 sufficiently to permit angular displacement of the jack screw upon spherical displacement of the connecting member 23 in the worm gear 18.

The frusto-spherical exterior surface 25 of the connecting member 23 includes an upwardly facing portion 25′ for which there is no mating portion of the worm gear surface 26 as it would not be possible to assemble the elements readily if there were. Rather, an annular thrust washer 27 is mounted in an annular recess 28 in the top of the worm gear 18 superjacent the frusto-spherical surface 26 thereof. This thrust washer 27 has a surface that mates with the upwardly facing portion 25′ of the connecting member surface 25 and is retained in mating relation by the upper of the load bearings 19, which overlaps both the worm gear 18 and the thrust washer 27. With this thrust washer arrangement, the jack mechanism 10 can operate under reverse load conditions in which the load is directed upwardly through the jack screw 12 and connecting member 23 to the thrust washer 27.

Rotation of the worm gear 18 is transmitted to the connecting member 23 and, therefore, to the jack screw 12 by keying means that include, in the illustrated embodiment, four equally spaced key pins 29 seated in bores 30 in the worm gear 18 and extending radially inward into recesses 31 in the connecting member 23 in alignment with the key pins 29. These recesses 31 are enlarged circumferentially with respect to the key pins 29 to permit the aforementioned spherical displacement of the connecting member 23 while remaining in driving relation with respect thereto. The key pins 29 are retained in the worm gear 18 by an exterior retaining ring 32 that surrounds the worm gear 18 at the key pin bores 30.

The connecting member 23 is secured to the upper end 24 of the jack screw 12 by threaded connection of the jack screw end 24 in a threaded axial bore 33 in the connecting member 23. This threaded connection serves as a load support between the screw 12 and connecting member 23. The screw end 24 is further supported in and is locked in the connecting member 23 against disassembling rotation by a transverse dowel member 34 that extends through a transverse bore 36 in the screw end 24 and into diametrically opposed bores 37 in the connecting member 23, which latter bores 37 may conveniently be formed as extensions of the key pin receiving recesses 31.

The jack screw 12 extends downwardly from the connecting member 23 through the base 17' of the housing 17 and through the aforementioned aperture 13 in the platform 11. The inner diameter of the housing base 17' is sufficient to avoid obstruction of the jack screw 12 when it is angularly displaced. Threaded to the lower end of the housing base 17' is a tubular sleeve 38 that extends through the platform aperture 13 to provide an attachment for the upper end of a bellows-type dust shield 39 that surrounds the jack screw 12 between the platform 11 and the load-carrying member 15 and has its lower end secured to a flange 40 on the member 15 for movement therewith.

The non-rotating nut 14 is interiorly threaded for mating with the screw threads, which fix the position of the nut with respect to the axis of the screw such that the nut cannot be angularly displaced to suit load conditions. This may be satisfactory for some purposes; however, the preferred embodiment includes the aforementioned load-carrying member 15 which is mounted on the nut 14 in a manner to permit spherical displacement. This is accomplished by the use of two pairs of thrust rings 41 and 42 disposed symmetrically with respect to the axis of the screw 12 at opposite ends of the nut 14. The thrust ring pairs 41 and 42 include inner rings 43 secured in annular recesses 44 at opposite ends of the nut 14 and having generally diagonally oppositely facing outer surfaces 43'. The outer rings 45 of the ring pairs 41 and 42 are secured within annular flanges 46 at the bottom and top of the load-carrying member interior and have inwardly facing diagonally opposite surfaces 45' disposed in mating relation with the surfaces 43' of the inner rings 43. All of the surfaces 43' and 45' are frusto-spherical and are formed on a common sphere that is centered at the axis of the nut 14 to provide for spherical displacement of the load-carrying member 15 on the nut 14, with the load-carrying member being centrally apertured as at 35 to permit the spherical displacement without contacting the jack screw 12.

The nut 14 is retained with the load-carrying member 15 against rotation while accommodating spherical displacement of the load-carrying member 15 with respect to the nut 14 by means of a pair of oppositely extending retaining studs 47 that are screwed into the wall of the nut 14 and extend radially therefrom into recesses 48 formed in opposite sides 49 of the load-carrying member 15. These stud receiving recesses 48 are enlarged circumferentially with respect to the studs 47 to permit spherical displacement of the load-carrying member 15 with respect to the nut 14 while engageable with the nut 14 to prevent rotation thereof.

The load may be mounted on or attached to the load-carrying member 15 in any suitable manner. For example, the unrecessed side plates 50 of the load-carrying member 15 could be extended in a yoke-like manner for support of loads thereon; or the unrecessed side plates 50 of two jack mechanisms could be formed from standard channel bars extending therebetween to provide a tiltable support for angularly positioning a load or to accommodate warpage, distortion, or other shape changes of the load; or the load could be secured directly to the side of one of the side plates 50, as in the case of a door raising mechanism or the like.

The present jack mechanism 10 may be made of any desired capacity. The embodiment illustrated is designed for handling loads of several tons, which are difficult to handle and present serious misalignment problems with conventional jacks, but which are readily and efficiently handled by the present jack mechanism due to the spherical and angular displacement capabilities of this jack mechanism.

Various modifications could be made in the manufacture of a jack mechanism according to this invention. For example, the jack screw 12 and connecting member 23 may be formed integrally or may be connected by a flange, nut, or pin connection, or the connecting member may be formed solid with an extension for attachment to the screw, or drive means other than the illustrated worm 16 and worm gear 18 may be used to transmit rotation to the jack screw 12, or other types of keying means may be utilized, or various modifications may be made of the other components of this jack mechanism.

It is understood that the accompanying illustration and the foregoing detailed description of the present embodiment is for the purpose of illustration only and this invention is not intended to be limited thereby or otherwise, except as defined in the appended claims.

I claim:

1. A non-binding jack mechanism of the rotating screw type capable of manipulating loads under conditions requiring angular displacement of the jack screw, said jack mechanism comprising an annular drive member, means supporting said drive member for rotation, means for rotating said drive member, a jack screw having connecting means thereon seated in said annular drive member for support of said jack screw thereby, said connecting means including spherically displacement means to permit angular displacement of said jack screw with respect to said drive member, means keying said connecting means to said annular drive member for driving rotation of said jack screw by said drive member, and a non-rotating load-carrying nut threaded on said jack screw for axial movement therealong upon rotation of said jack screw.

2. A non-binding jack mechanism of the rotating screw type capable of manipulating loads under conditions requiring angular displacement of the jack screw, said jack mechanism comprising an annular drive member, means supporting said drive member for rotation, means for rotating said drive member, a jack screw having connecting means thereon seated in said annular drive member for support of said jack screw thereby and being spherically displaceable therein to permit angular displacement of said jack screw with respect to said drive member, means keying said connecting means to said annular drive member for driving rotation of said jack screw by said drive member, said keying means accommodating said spherical displacement of said connecting means, and a non-rotating load-carrying nut threaded on said jack screw for axial movement therealong upon rotation of said jack screw.

3. A jack mechanism according to claim 2 and characterized further in that said annular drive member has an interior frusto-spherical surface, and said connecting means has an exterior frusto-spherical surface, said frusto-spherical surfaces mating for universal pivotal support of the connecting means in said annular member.

4. A jack mechanism according to claim 3 and characterized further in that said keying means comprises a key pin fixed to one of said annular member and connecting means and extending into a recess formed in the other of said annular member and connecting means, said recess being enlarged with respect to said key pin to permit said spherical displacement.

5. A jack mechanism according to claim 2 and characterized further in that an end of said jack screw is threadably secured in a threaded bore in said connecting means.

6. A jack mechanism according to claim 5 and characterized further in that said jack screw is locked to said connecting means for rotation therewith by a transverse dowel member extending into both said connecting means and said jack screw end.

7. A jack mechanism according to claim 2 and characterized further in that said jack screw extends axially into said connecting means and is locked thereto for rotation therewith by a transverse dowel member extending into both said connecting means and said jack screw.

8. A jack mechanism according to claim 2 and characterized further in that a load-carrying member is mounted on said nut and is spherically displaceable thereon for nonbinding load support.

9. A jack mechanism according to claim 8 and characterized further in that one of said nut and load-carrying member has a retaining stud extending therefrom into a recess in the other of said nut and load-carrying member to retain said nut against rotation, said recess being enlarged with respect to said stud to permit said spherical displacement.

10. A jack mechanism according to claim 8 and characterized further in that said load-carrying member is mounted on said nut through a pair of thrust rings having mating frusto-spherical surfaces.

11. A jack mechanism according to claim 10 and characterized further in that said load-carrying member is mounted on said nut through two pairs of oppositely acting thrust rings for load support in opposite directions, the rings of each said pair having mating frusto-spherical surfaces and said surfaces of all said rings being formed on a common sphere.

12. A jack mechanism of the rotating screw type capable of supporting loads under conditions wherein the load support is spherically displaced with respect to said jack mechanism, said jack mechanism comprising a jack screw, means for rotating said jack screw, a non-rotating nut threaded on said jack screw for axial movement therealong upon rotation of said jack screw, a load-carrying member, a pair of thrust rings disposed between said nut and said load-carrying member for mounting said load-carrying member on said nut, said thrust rings having mating frusto-spherical surfaces that permit spherical displacement of said load-carrying member with respect to said nut.

13. A jack mechanism according to claim 12 and characterized further in that there are two pairs of oppositely acting thrust rings between said load-carrying member and said nut for load support in opposite directions, the rings of each said pair having mating frusto-spherical surfaces and said surfaces of all said rings being formed on a common sphere.

14. A jack mechanism according to claim 12 and characterized further in that one of said nut and load-carrying member has a retaining stud extending therefrom into a recess in the other of said nut and load-carrying member to retain said nut against rotation, said recess being enlarged with respect to said stud to permit said spehrical displacement.

References Cited
UNITED STATES PATENTS

| | | | |
|---|---|---|---|
| 3,069,924 | 12/1962 | Watanabe et al. | 254—103 X |
| 3,135,497 | 6/1964 | Beck | 254—193 |
| 3,229,545 | 1/1966 | Hautay | 74—424.8 |
| 3,257,098 | 6/1966 | Hotchkin | 254—86 |

OTHELL M. SIMPSON, *Primary Examiner.*

UNITED STATES PATENT OFFICE
CERTIFICATE OF CORRECTION

Patent No. 3,339,892 September 5, 1967

John J. Dixon

It is hereby certified that error appears in the above numbered patent requiring correction and that the said Letters Patent should read as corrected below.

Column 4, line 46, for "displacement" read -- displaceable --; column 6, line 34, for "254-193" read -- 254-103 --.

Signed and sealed this 24th day of September 1968.

(SEAL)
Attest:

Edward M. Fletcher, Jr.
Attesting Officer

EDWARD J. BRENNER
Commissioner of Patents